(12) United States Patent
Kawata et al.

(10) Patent No.: US 7,957,068 B2
(45) Date of Patent: Jun. 7, 2011

(54) OPTICAL NEAR-FIELD DISTRIBUTION TRANSFER DEVICE

(75) Inventors: Satoshi Kawata, Saitama (JP); Jun-ichi Kato, Saitama (JP); Atsushi Ono, Saitama (JP)

(73) Assignee: Riken, Saitama (JP)

( * ) Notice: Subject to any disclaimer, the term of this patent is extended or adjusted under 35 U.S.C. 154(b) by 242 days.

(21) Appl. No.: 12/097,999

(22) PCT Filed: Dec. 19, 2006

(86) PCT No.: PCT/JP2006/325242
§ 371 (c)(1),
(2), (4) Date: Nov. 3, 2008

(87) PCT Pub. No.: WO2007/072806
PCT Pub. Date: Jun. 28, 2007

(65) Prior Publication Data
US 2009/0067028 A1    Mar. 12, 2009

(30) Foreign Application Priority Data

Dec. 20, 2005 (JP) .................................. 2005-367201

(51) Int. Cl.
*G02B 27/10* (2006.01)
(52) U.S. Cl. ...................................................... 359/625
(58) Field of Classification Search .................. 359/637
See application file for complete search history.

(56) References Cited

U.S. PATENT DOCUMENTS

| | | | |
|---|---|---|---|
| 3,310,808 A * | 3/1967 | Friis .............................. | 343/872 |
| 2004/0115696 A1* | 6/2004 | Heller ............................ | 435/6 |
| 2004/0160675 A1* | 8/2004 | Nemoto et al. ................. | 359/626 |

FOREIGN PATENT DOCUMENTS

JP    2005285162 A    10/2005

OTHER PUBLICATIONS

Title: Subwavelength optical imaging through a metallic nanorod array, Author: Atsushi Ono, Jun-ich Kato, Satoshi Kawata, Published date: Dec. 28, 2005, Phisical Review Letters, Week ending Dec. 31, 2005.*
Ono et al., "Subwavelength Optical Imaging through a Metallic Nanorod Array", Physical Review Letters, vol. 95, No. 26, 2005, pp. 267407-1-267407-4.
Imura et al., "Near-field optical imaging of plasmon modes in gold nanorods", The Journal of Chemical Physics, vol. 122, 2005, pp. 154701-1-154701-5.

* cited by examiner

*Primary Examiner* — Ricky L Mack
*Assistant Examiner* — Vipin M Patel
(74) *Attorney, Agent, or Firm* — Muncy, Geissler, Olds & Lowe, PLLC

(57) ABSTRACT

Long-distance transfer of a super-resolution near field can be performed with a wavelength condition of high degree of freedom. Not only an image in same size can be merely transferred, but also a magnified image can be transferred. Thus the processing technique of a near-field image is improved. Small rods are erected at predetermined spacing with one another on a two-dimensional plane. At least the exterior surface of each small rod is made of a predetermined material having a dielectric constant $\in_m$ meeting the condition "$\in_m \leq -\in_d$" where $\in_d$ is the dielectric constant of the surrounding medium. The axes of the small rods can be extended to a predetermined direction with respect to the two-dimensional plane. An optical near-field is incidented to one end of each small rod.

9 Claims, 14 Drawing Sheets

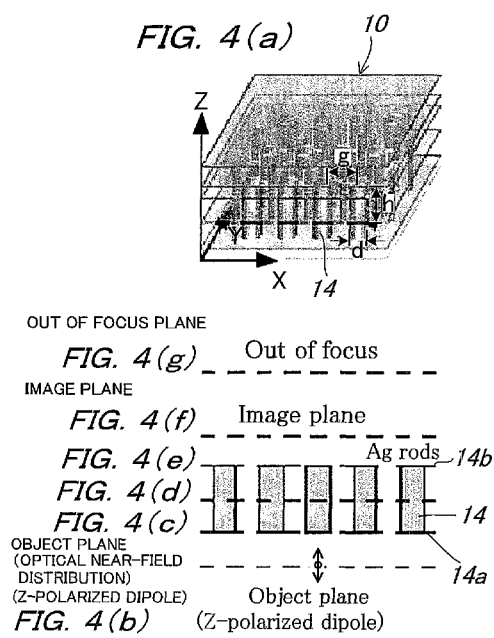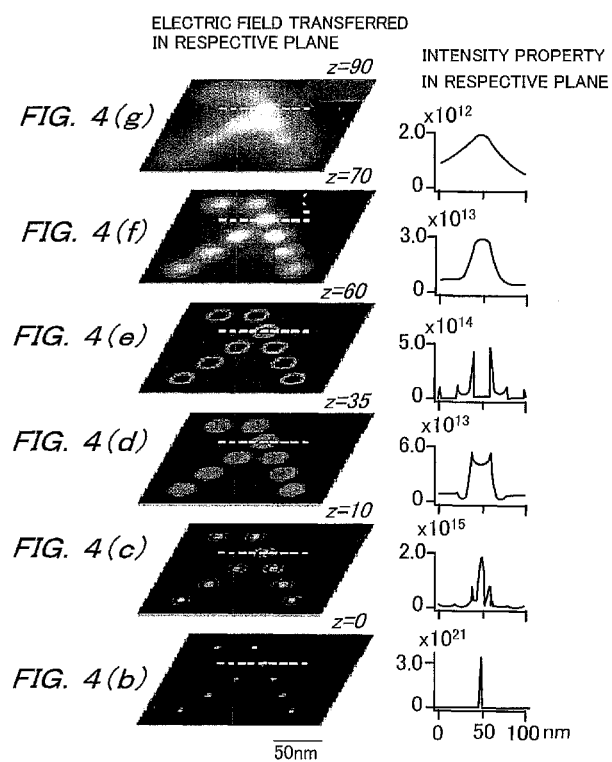

FIG. 5(a)
$|Ez|^2$
FIG. 5(b)
$|Ex|^2$
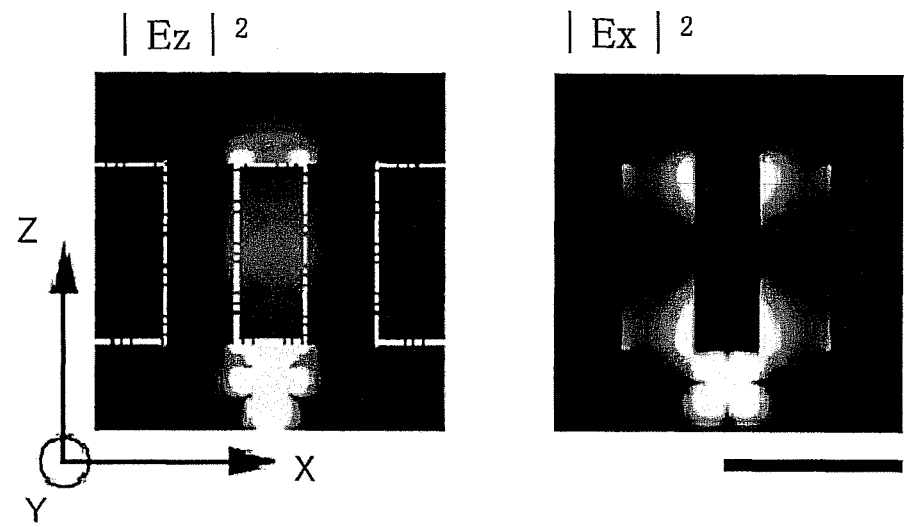
FIG. 5(c)
$I = |E|^2$
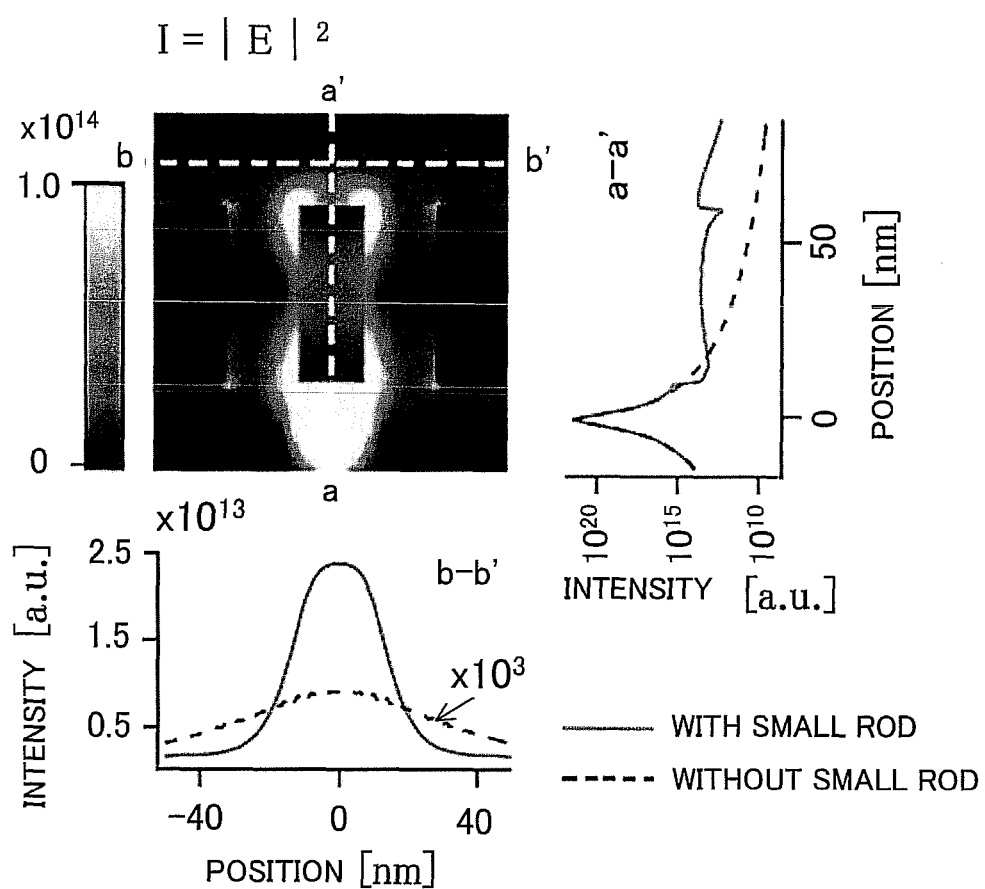
—— WITH SMALL ROD
- - - - WITHOUT SMALL ROD 150nm rod
274.01 THz
1094.85 nm (OPERATING WAVELENGTH)
2.95e6 trans (INTENSITY)
050923-2
20000 steps 50nm rod × 3
gap 10nm
567.84 THz
528.32nm (OPERATING WAVELENGTH)
4.26e6 trans (INTENSITY)
050927-1
20000 steps

FIG. 12

| PARAMETER | SET RANGE . CHARACTERISTIC PROPERTY |
|---|---|
| ROD DIAMETER: | RANGE OF FROM MINIMUM VALUE nm ORDER TO AROUND 1/2 APPLIED WAVELENGTH<br>WHEN DIAMETER INCREASES, RESONANCE WAVELENGTH SHIFTS TO RANGE OF SHORTER WAVELENGTH |
| ROD SPACING: | DISTANCE WHEREIN ELECTRIC FIELD EMERGING FROM ONE ROD DOES NOT COURLED TO ADJACENT ROD<br>VARY IN RESPONSE TO REFRACTIVE INDEX OF SURROUNDING MEDIUM<br>REFRACTIVE INDEX INCREASES → ALLOWABLE SPACING DECREASES<br>(TYPICAL VALUE: 40 nm OR MORE IN CASE THAT REFRACTIVE INDEX OF SURROUNDING MEDIUM IS 1, AND ROD DIAMETER IS 20 nm) |
| ROD LENGTH : | SEVERAL nm OR MORE, THEORETICAL LIMIT IS DECIDED IN VIEW OF APPLIED WAVELENGTH<br>THERE IS REPORT OF UP TO AROUND 10 MICROMETER AS TO SINGLE ROD. Ref[A]<br>LINEAR RELATIONSHIP SHOWN IN FIG. 13 EXISTS BETWEEN ASPECT RATIO (LENGTH/DIAMETER) AND RESONANCE WAVELENGTH, SO THAT DEGREE OF FREEDOM INCLUDING REFRACTIVE INDEX OF SURROUNDING MEDIUM IS HIGH. Ref[B] |
| ROD MATERIAL : | ELECTRIC CONDUCTOR SATISFYING CONDITION: DIELECTRIC CONSTANT OF ROD<br>$\varepsilon_m \leq -\varepsilon_d$ (DIELECTRIC CONSTANT OF SURROUNDING MEDIUM) |
| SURROUNDING MEDIUM : | DIELECTRIC MATERIAL, SEMICONDUCTOR HAVING DIELECTRIC CONSTANT $\varepsilon_d \geq 1$<br>EXAMPLE : DIELECTRIC MATERIAL, GLASS, $SiO_2$, $Al_2O_3$ etc.<br>SEMICONDUCTOR: Si, GaAs, GaN, AlAs etc.<br>WHEN REFRACTIVE INDEX $\sqrt{\varepsilon_d}$ IS HIGH, RESONANCE WAVELENGTH SHIFTS TO RANGE OF SHORTER WAVELENGTH |
| OPERATING WAVELENGTH | WAVELENGTH EQUAL TO OR MORE THAN EXCITATION WAVELENGTH $\lambda_p$ OF PLASMON DECIDED BY MATERIAL OF ROD USED<br>EXAMPLE : AROUND 390 nm IN CASE OF Au, AROUND 360 nm IN CASE OF SILVER<br>TRANSFER CAUSES AT ARBITRARY WAVELENGTH, BUT EFFICIENCY IS HIGH AT RESONANCE WAVELENGTH |
| MAGNITUDE OF gap DISTANCE IN CASE THAT RODS ARE LAMINATED | EQUAL TO OR LESS THAN 30 nm<br>gap→0  CONVERGES WITH RESONANCE CONDITION OF CONTINUOUS RODS<br>gap→WIDE  SHIFTS TO RANGE OF SHORTER WAVELENGTH, CONVERGES WITH CASE OF SHORT SINGLE ROD (SEE FIG. 14). |

Ref[A] R. M. Dickson and L.A.Lyon, J.Phys, Chem.B 104. 6095(2000).

Ref[B] J. R. Krenn. G.Schider, W.Rechberger, B. Lamprecht, A. Leitner, F. R. Aussenegg,and J. C. Weeber, Appl. Phys. Lett. 77,3379(2000).

OPTICAL NEAR-FIELD DISTRIBUTION TRANSFER DEVICE

TECHNICAL FIELD

The present invention relates to an optical near-field distribution transfer device, and particularly to an optical near-field distribution transfer device which is used suitably in case of imaging a material.

BACKGROUND TECHNOLOGY

Heretofore, it has been known that light propagates in the atmosphere, light can transmit material information in a wide spectrum extending from ultraviolet to infrared, and light is a probe capable of imaging a material even in the atmosphere or water which is different from an electron microscope, and an atom force microscope.

It is recognized that such imaging by the use of light is an extremely important technology in also a field of bioscience or the like wherein an observation of, for example, a live cell in a subwavelength level is required.

However, there is such a problem that the limit of resolution due to wave properties of light in imaging wherein a conventional light is used. Namely, the resolution of an image by means of light is in a limit up to a size of wavelength order (several 100 nm) at the most because of the diffraction phenomena of light.

As described above, it is difficult to obtain a spatial resolution exceeding wavelength order by means of a usual microscopical technique. Particularly, a near-field scanning optical microscopy (NSOM), which requires a certain period of time for probe scanning in order to image fine structural information of a submicron wavelength order beard by photons existing locally in the vicinities of the surface of a material body which is concerned with optical near-field, is necessary (see non-patent literary document 1).

A near-field scanning optical microscopy (NSOM) is developed absolutely to perform imaging and analysis due to probe scanning of optical near-field distribution. Consequently, the NSOM is not suitable for the use of the transfer of such information and applying a parallel processing therefor.

Namely, a NSOM has been used heretofore as a device for imaging fine structural information of a subwavelength order, but not a manner for transmitting a near-field image of a subwavelength has been proposed, and thus, the provision of such manner has been strongly desired.

Incidentally, such theoretical provision that a metal thin film having a thickness of several 10 nm functions as a lens having very high resolution has been made in recent years (see non-patent literary document 2). Effectiveness of the theoretical provision is confirmed more recently as a result of experiments (see non-patent literary document 3).

However, the manners disclosed in the non-patent literary documents 2 and 3 relate to a method of image formation by using an extremely thin metal film having a thickness of around several 10 nm. Accordingly, there are such problems that restrictions for an operating frequency, a film thickness condition of the metal film and the like are extremely severe, so that there are many technical difficulties in the actual application of lithography and the like; and further that an out-of-focus image is unavoidable due to the loss of a metal.

On one hand, such a manner that a metallic nanowire is used to transmit a light wave as a wave of electron has been proposed (see a non-patent literary document 4). However, such a problem that there are many technical difficulties in the actual application of lithography in also this manner has been pointed out.

Non-patent literary document 1: S. Kawata et al. ed. "Nano-Optics", Springer series in optical science (2002)
Non-patent literary document 2: J. B. Pendry, Phys. Rev. Lett. 85, 3966 (2000)
Non-patent literary document 3: N. Fang, et al. Science, 308, 534 (2005)
Non-patent literary document 4: J. Takahara, et al. Opt. Lett. 22, 475 (1997)

DISCLOSURE OF THE INVENTION

Problems to be Solved by the Invention

The present invention has been made in view of the problems as described above involved in the prior art, and an object of the invention is to provide an optical near-field distribution transfer device which is arranged in such that a longer-distance transfer of a super-resolution optical near-field can be performed under the wavelength condition having a higher degree of freedom.

Furthermore, another object of the invention is to provide an optical near-field distribution transfer device which is arranged in such that not only an image in same size can be merely transferred, but also an enlarged image can be transferred, whereby the processing technique of a near-field image may be improved.

Means for Solving the Problems

In order to achieve the above-described object, the invention is constituted in such that an array is formed by arranging small rods (e.g. they are made from a metal, but the shape of each rod is not limited to a columnar outline) having a very small diameter as compared with a wavelength in an electromagnetic zone extending from ultraviolet to far infrared into a predetermined pattern (e.g. square or hexagonal close-packed structure), whereby an optical near-field linked to one end of each small rod on either side of the small rods is propagated efficiently to the end on the opposite side of the small rods having a length from several tens of nm to a wavelength order or longer.

Furthermore, in the invention, each small rod is divided along the axial direction, and numbers of such small rods divided is stacked to each other in the axial direction to arrange an array structure, whereby it becomes possible to implement long-distance propagation with a short wavelength.

The invention of such transfer mode uses resonance. Thus, the imaging of super-resolution, and the two-dimensional long-distance light transfer of an optical near-field can be realized according to the invention, whereby it becomes possible to transmit an optical near-field distribution in a distance of a length equal to or longer than a wavelength order.

Namely, according to the invention, the imaging of nano-size can be implemented over the limit of wavelength due to diffraction of a light even when the light is used. Accordingly, the invention provides a technique based on the novel principle quite different from a conventional principle. According to the invention as described herein, the following advantageous effects are achieved. Namely, near-field image information can be transferred in the propagation distance for which the transfer cannot be attained by a conventional technique. Moreover, the information transferred can be recorded, whereby a patterning application, and the imaging of a subwavelength zone being equal to or less than diffraction limit become possible. Besides, in the case that a plurality of small rods is stacked to each other in the axial direction, an array is arranged in such that ends of the small rods on the output side are expanded, whereby the image propagated can be enlarged.

In other words, the invention utilizes the oscillation of electrons (localized plasmon) in the axial direction of small rods composed of a metal nanostructure made of, for example, a silver column having a diameter of a nanometer order, so that the image information having a limit of resolution being far below a wavelength can be transferred by means of the small rods. Thus, the invention contributes considerably to developments for a novel applied technology of light in a nanometer region.

In addition, although it has been considered heretofore that a nanomaterial is limited to carbon-base or semiconductor-base, or organic molecular materials, it becomes clear by the invention that a metal nanostructure is one of dominant nanomaterials.

In the following, the principle of the invention will be described for the sake of understanding easily the invention. The invention makes the transfer of image possible with exceeding the limit of resolving power due to wave properties of light. For instance, the invention is constituted in such that an array wherein columns each of which is made of silver and has a diameter of a nanometer order are disposed two-dimensionally (hereinafter referred optionally to as "two-dimensional metal nanocolumn array") is used, whereby information can be transferred completely from the end on either side of the two-dimensional metal nanocolumn array to the end on the opposite side thereof in the axial direction over the limit of wavelength.

For instance, when an optical near-field is input to a columnar metal nanostructure made of silver and having a diameter of a nanometer order, localized surface plasmon polariton is induced on the surface of the metal nanostructure. In recent years, researches are actively conducted with respect to nanoimaging, nanolithography, plasmonic crystals and the like which use surface plasmon polariton; and they are attracted as a new field of research called nanoplasmonics.

Namely, there is the use of surface plasmon polariton (SPP) as one of promising method for confining a light in a region of a nanometer order in nanophotonics. The surface plasmon polariton is a condition wherein plasmon which is a mass oscillation phenomenon of free electrons inside a noble metal represented by gold (Au) or silver (Ag) becomes a propagating wave in a situation wherein the plasmon acts mutually with the outside light in the surface of the metal to be confined intensively inside the surface (see FIG. 1). If a metal is in small closed shape, for example, when it has a spherical or columnar shape having a diameter of several to several tens nm, the surface plasmon polariton combines easily with a light, so that the light can be confined into a small region. This is called by the name of localized surface plasmon polariton (see FIG. 2); and it is well known that the localized surface plasmon polariton scatters intensively the light of a particular color through the resonance to become a cause for coloring stained glass.

The present invention aims particularly at a mutual action of the phenomenon as described above with an optical near-field in small rods consisting of columnar materials each having a diameter of a nanometer order, for example, metal columnar small rods each having a diameter of a nanometer order (hereinafter referred optionally to as "metal nanocolumnar small rods")

An optical near-field may be said that a light which does not propagate far away unlike a usual light, but a light being all over the surface of a material body. An optical near-field bears information as to the fine structure of a material of a size being far below the wavelength of light. The oscillation in the column axial direction of localized surface plasmon polariton in the above-described metal nanocolumnar small rods acts mutually particularly intensively with such optical near-field. Accordingly, when the metal nanocolumnar small rods are disposed two- or three-dimensionally as mentioned hereinbelow by referring to FIG. 3, a distribution of the optical near-field on the end of an array on either side is converted into the resonant electron oscillation (localized surface plasmon polariton) along the column axial direction, and the localized surface plasmon polariton converted is transferred to the end on the opposite side of the array, whereby a kind of parallel imaging method can be realized. The invention is based on the principle as described above.

Namely, according to the invention, an optical near-field distribution transfer device is constituted in such that a plurality of small rods each of which at least the outer circumferential part thereof is formed by a predetermined material the dielectric constant $\in_m$ thereof meets the condition:

$$\in_m \leq -\in_d$$

with respect to a dielectric constant $\in_d$ of a surrounding medium are erected at predetermined spacing on a two-dimensional plane in such that the axial directions of the small rods extend in predetermined directions, respectively; and an optical near-field is directed to one end of each of the small rods.

According to the invention, each of the small rods has a substantially columnar shape.

According to the invention, a diameter of the small rod is substantially equal to or less than ½ of the wavelength of the optical near-field to be input to the small rod.

According to the invention, the predetermined spacing corresponds to a distance wherein an electric field emerging from the small rod does not bind to the adjacent small rod.

According to the invention, a length of the small rod is 10 μm or less.

According to the invention, the surrounding medium is a dielectric material or a semiconductor meeting the condition:

$$\in_d \geq 1.$$

According to the invention, the dielectric material is glass, $SiO_2$, or $Al_2O_3$; and the semiconductor is Si, GaAs, GaN, or AlAs.

According to the invention, the predetermined material is Ag, Au, Cu, Al, Ni, or Pt.

According to the invention, numbers of the small rods are stacked to each other in the axial direction in a predetermined gap.

According to the invention, the predetermined gap is 30 nm or less.

According to the invention, the small rods obtained by stacking numbers of small rods to each other in the axial direction wherein the small rods are extended in the axial directions different from one another with respect to the two-dimensional plane.

ADVANTAGEOUS EFFECTS OF THE INVENTION

In accordance with the present invention, an optical near-field distribution transfer device having the following excellent advantage can be provided. In the optical near-field distribution transfer device of the invention, a longer-distance transfer of a super-resolution near field can be performed under a wavelength condition having a higher flexibility.

Furthermore, according to the present invention, an optical near-field distribution transfer device having the following excellent advantage can be provided. In the optical near-field distribution transfer device of the invention, not only an image in same size can be merely transferred, but also an enlarged image can be transferred, whereby the processing technique of a near-field image may be improved.

BRIEF DESCRIPTION OF THE DRAWINGS

FIGS. 4(a) through 4(g) are explanatory diagrams showing numerical simulations of the optical near-field distribution transfer device of the invention in accordance with a three-dimensional finite-difference time-domain method, respectively.

FIGS. 5(a), 5(b), and 5(c) are explanatory diagrams showing numerical simulations of the optical near-field distribution transfer device of the invention in accordance with a three-dimensional finite-difference time-domain method, respectively.

FIG. 6(b) indicates a relationship between a spacing g among small rods and a transfer intensity.

FIG. 12 is a diagram showing the relativity between a range for setting parameters for controlling characteristic properties of an optical near-field distribution transfer device according to the invention and the characteristic properties thereof.

Figure 1:
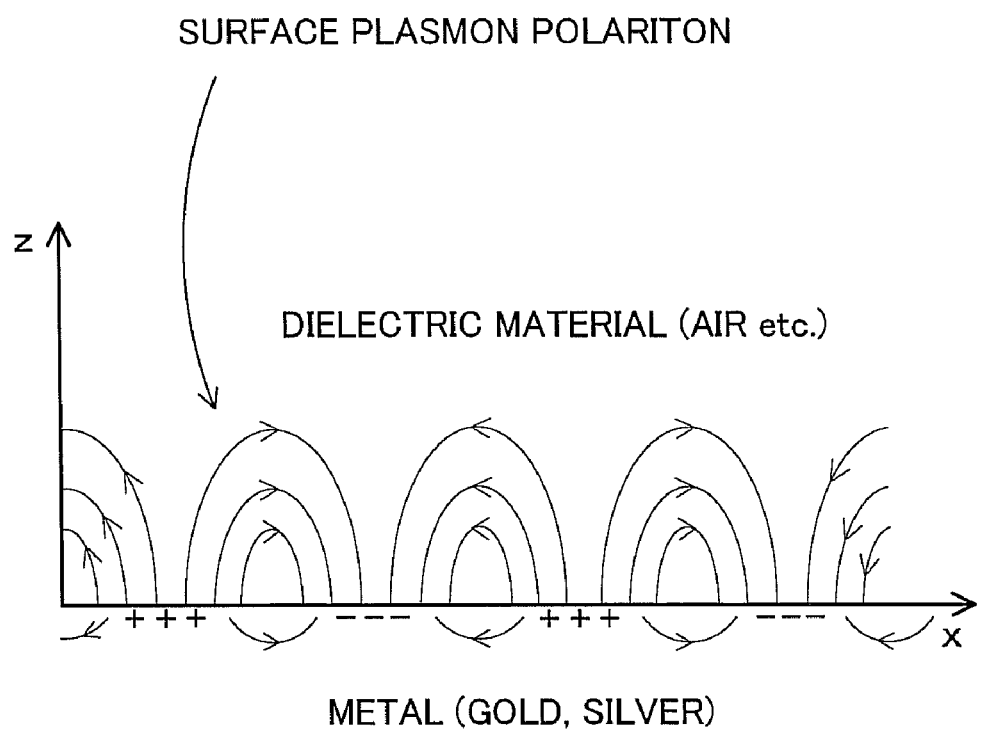
FIG. 1 is an explanatory diagram for surface plasmon polariton.
Figure 2:
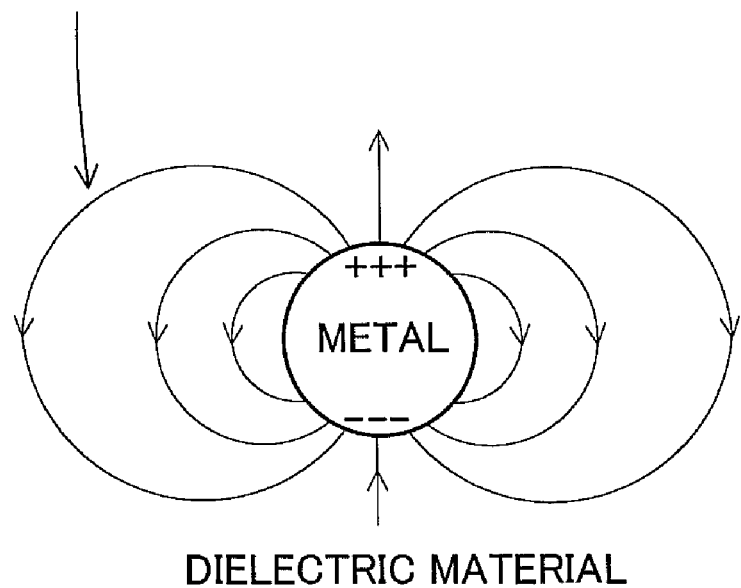
FIG. 2 is an explanatory diagram for localized surface plasmon polariton.

EXPLANATION OF REFERENCE NUMERALS 10 optical near-field distribution transfer device
12 surrounding medium
14 small rod
14a end
14b end
100 optical near-field distribution transfer device

THE BEST MODE FOR EMBODYING THE INVENTION

In the following, an example of embodiments of the optical near-field distribution transfer device according to the present invention will be described in detail by referring to the accompanying drawings.

Figure 3:
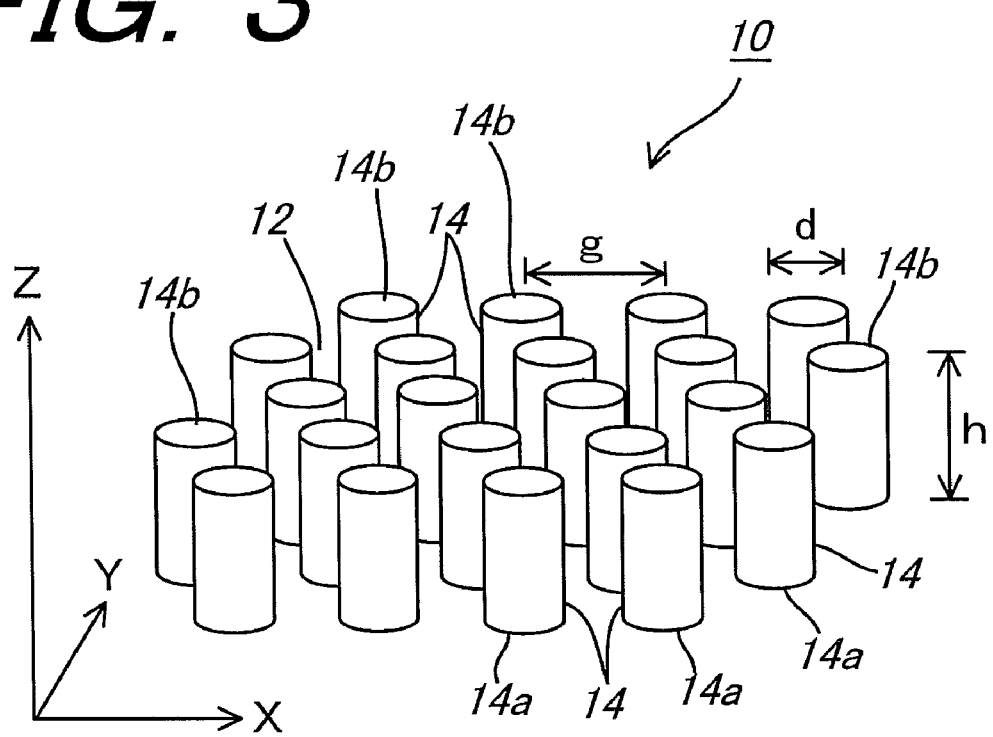
FIG. 3 is a conceptual, structural, perspective view for explaining a first embodiment of the optical near-field distribution transfer device according to the present invention.

First, FIG. 3 is a conceptual, structural, perspective view for explaining a first embodiment of the optical near-field distribution transfer device according to the present invention.

An optical near-field distribution transfer device 10 is constituted in such that a plurality of, for example, columnar solid small rods 14 made of silver (Ag), each of which has a diameter d of a nanometer order (e.g. 20 nm) and a length h in the axial direction (a height along Z-direction) of a nanometer order (e.g. 50 nm) in the surrounding medium 12 such as a dielectric material, and a semiconductor having a dielectric constant $\in_d$ is "$\in_d \geq 1$", are erected at predetermined spacing g (the spacing g corresponds to a distance within which an electric field emerging from a small rod 14 does not bind to the adjacent small rod 14. For instance, the spacing g is 40 nm or more in the case that a refractive index of the surrounding medium 12 is 1, and a diameter d of the small rod is 20 nm. In this case, a plurality of small rods 14 is erected in the spacing g (which corresponds to a distance extending from the center of a small rod 14 to the center of the adjacent small rod.) one another on a XY-plane being a two-dimensional plane in XYZ-orthogonal coordinate system in such that the axial directions are extended along Z-direction, respectively.

Furthermore, it is arranged in such that an optical near-field is input to the ends 14a on either side of small rods 14 the plurality of which are erected.

The optical near-field distribution transfer device 10 shown in FIG. 3 is fabricated by setting in the small rods 14 in a single-layered array on the XY-plane.

In the above-described constitution, when an optical near-field is input to the ends 14a on either side of the small rods 14, the information contained in the optical near-field can be transferred from the side of the ends 14a of the small rods 14 to the opposite side of ends 14b of the small rods 14 in a condition exceeding the limit of wavelength.

The inventor(s) of this application have made a numerical simulation called by the name of a three-dimensional finite-difference time-domain (FDTD) method with respect to relations of image transfer efficiency in the case that device parameters such as a diameter d of the small rod 14 of the optical near-field distribution transfer device 10, a length h of the small rod 14, a spacing g among the small rods, and a refractive index of the surrounding medium 12, or the frequency of a light source are changed.

In the numerical simulation according to the three-dimensional finite-difference time-domain method, the calculation is conducted in such condition that a model space of several hundred cubic nanometers is divided into cells of 1 nm, the metallic part thereof is assumed to be a free-electron metal called Drude model in a condition proximate to actual gold or silver. As a light source, Z-polarized dipoles are disposed in the vicinities of either ends 14a of the small rods corresponding to the input side as a dipole oscillator along the axial direction of the small rods 14.

In the following, the results of the numerical simulation according to the above-described three-dimensional finite-difference time-domain method will be described.

First, the results of the numerical simulation of the optical near-field distribution transfer device 10 containing the plurality of small rods 14 being a plurality of silver rods (Ag rods) each having a diameter d of 20 nm, a length h of 50 nm, and a spacing g of 40 nm are shown in FIGS. 4(a) through 4(g).

In FIGS. 4(a) through 4(g), FIG. 4(a) shows the constitution of the optical near-field distribution transfer device 10 wherein the lower part thereof corresponds to a view for explaining positional relations of respective planes with respect to the optical near-field distribution transfer device 10. FIG. 4(b) shows an object plane representing an optical near-field distribution; FIG. 4(c) shows a plane positioning at either ends 14a of the small rods 14; FIG. 4(d) shows a plane positioning at the intermediate of the length direction of the small rods 14; FIG. 4(e) shows a plane positioning at the other ends 14b of the small rods 14; FIG. 4(f) shows an image plane; and FIG. 4(g) shows a plane of out of focus.

As shown in FIGS. 4(a) through 4(g), the distribution of optical near-field on either ends 14a of the small rods 14 is converted into resonant electronic oscillation along the axial direction of the small rods 14 (localized surface plasmon polariton) to transmit it to the side of the other ends 14b, whereby a parallel imaging method is realized.

Figure 6A:
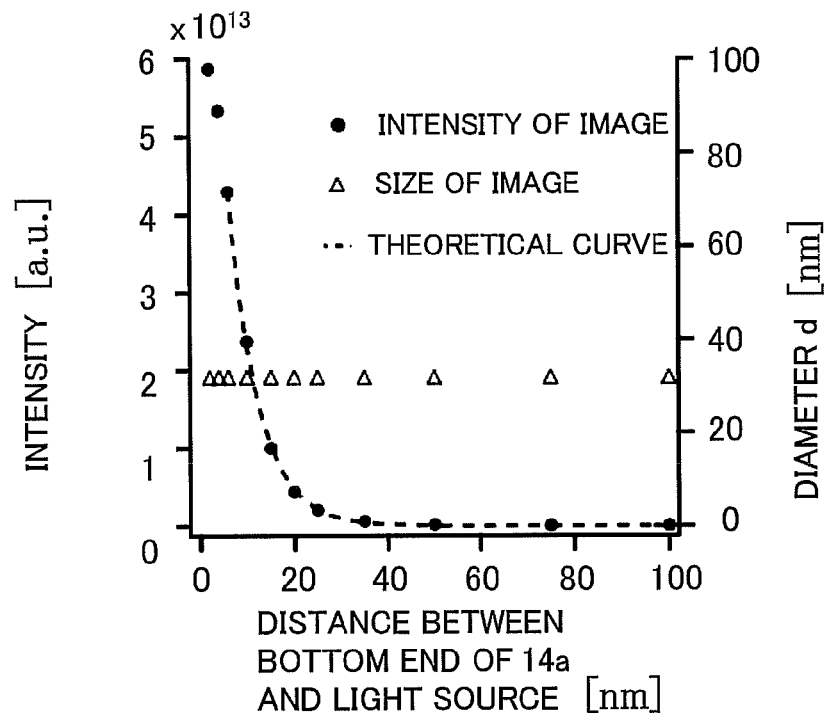
FIGS. 6(a) and 6(b) are explanatory diagrams showing numerical simulations of the optical near-field distribution transfer device of the invention in accordance with a three-dimensional finite-difference time-domain method, respectively, wherein FIG. 6(a) indicates a relationship of a distance between an end 14a of a small rod and a light source, and a transfer intensity.
Figure 6B:
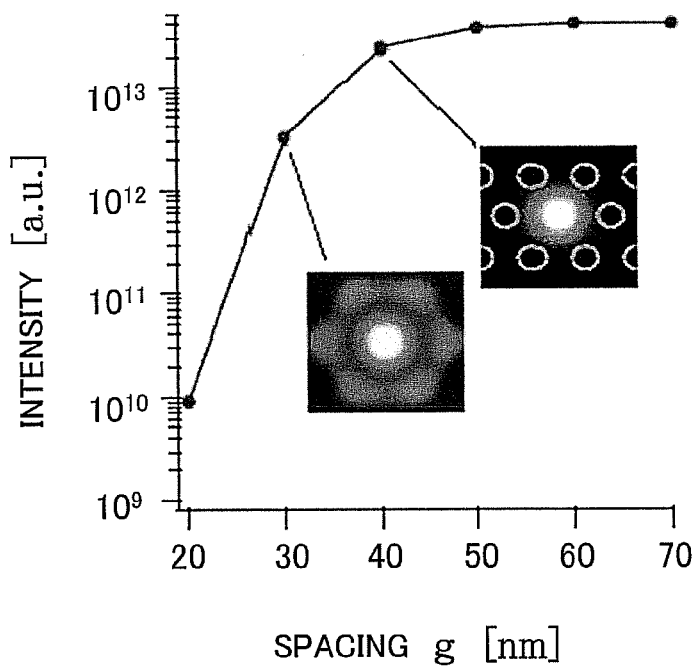

Next, the graphs relating to longitudinal resonance phenomena along the axial direction of the small rods 14 and various characteristic properties are shown in FIGS. 5(a), 5(b) and 5(c) as well as FIGS. 6(a) and 6(b). In this respect, numerical simulations are made with respect to the small rods 14 having a variety of sizes, and alignments of the small rods 14. As a result of the investigation of characteristic properties in the simulations, it is found that there is the optimum frequency appearing on the other ends 14b being the output end wherein the electron oscillation of localized plasmon is the strongest, when a diameter d and length h of each of the small rods 14 are selected at certain values, respectively.

For instance, green light of 500 nm wavelength resonates strongly in the optical near-field distribution transfer device 10 wherein a diameter d of a columnar small rod 14 is 20 nm, a length h of the small rod 14 is 50 nm, and a spacing g among the small rods is 40 nm; and strong hot spots (corresponding to the regions represented by white color in the image views of FIGS. 5(a), 5(b), and 5(c), and such hot spots are represented also by white color in the other Figures) appear on the ends 14b of the output side of the small rods 14 of the optical near-field distribution transfer device 10 as shown in FIGS. 5(a), 5(b), and 5(c) so that there is scarcely the leakage in a transverse direction.

Moreover, when a distance between the dipole oscillator of a light source and the ends 14a of the small rods 14 is changed, there is a strong distance dependency in a conjunction of the light source with the small rods 14 (see FIGS. 6(a) and 6(b)). This means that the optical near-field distribution transfer device 10 has an extremely strong mutual action with an optical near-field.

As described above, numerical simulations are conducted with respect to the small rods 14 having various sizes and the alignments thereof to determine the characteristic properties. As a result, it has been found that when a certain diameter d and length h of each of the small rods 14 are selected, there is the optimum frequency due to which the strongest electron oscillation of localized plasmon appears in response thereto on the output end of the small rods.

From these results, it is understood that when a pertinent light source wavelength is selected in the optical near-field distribution transfer device 10, the information of an optical near-field can be transferred efficiently with a high space resolution from the side of ends 14a being the input side of the optical near-field distribution transfer device 10 to the side of ends 14b being the output side.

Furthermore, the spatial resolution of an image transferred in the above-described design parameters is decided dependent on a spacing g being a pitch with which small rods are disposed. In this connection, when a diameter d of a columnar small rod 14 is 20 nm, a length h of the small rod 14 is 50 nm, and a spacing g thereof is 40 nm in the optical near-field distribution transfer device 10, the spatial resolution is 40 nm.

In the case that an image is transferred by the use of the small rods 14 each having a longer length h, it becomes possible to transmit the image by an amount corresponding to each length h of the small rods 14, when a wavelength component corresponding to a higher resonance mode dependent on the length is used.

In addition, when fluorescent dye or semiconductor nanoparticles are disposed on the ends 14b of the output side of the optical near-field distribution transfer device 10, the output image may also be converted into a propagation light.

As described above, the optical near-field distribution transfer device 10 is a device wherein an array of the small rods 14 formed by a metal such as silver of a nanometer order is used as a novel plasmonic structure wherein a near-field two-dimensional pattern of the diffraction limit or less which is disposed on the input plane of the array is transferred without blurring to the output end through the array of the small rods 14, i.e. a plasmonic nanorod array. This result is confirmed by the numerical simulation according to a three-dimensional finite-difference time-domain method.

The localized plasmon peculiar to the above-described small rods 14 contributes to the mechanism of a super-resolution imaging, and as a consequence, the image can be highly efficiently transferred due to the resonance wavelength.

Figure 7:
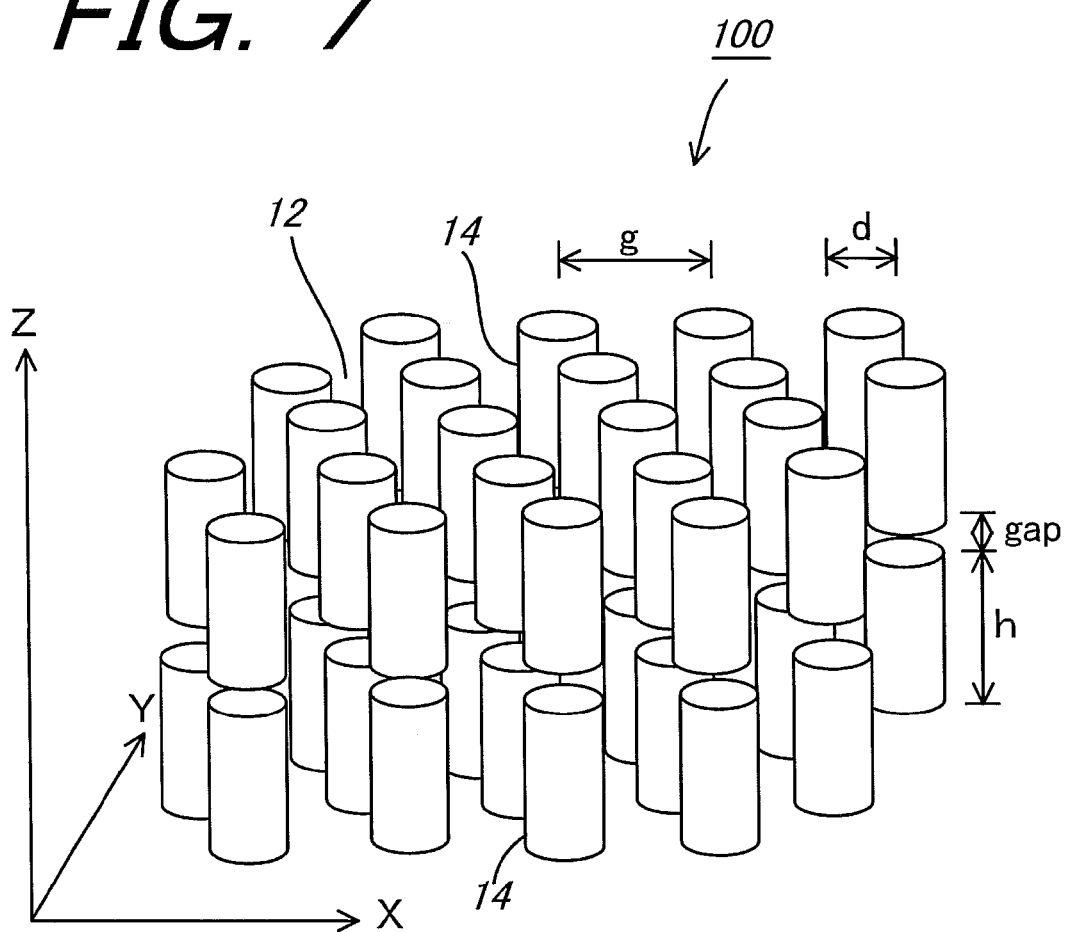
FIG. 7 is a conceptual, structural, perspective view for explaining a second embodiment of the optical near-field distribution transfer device according to the present invention.
Figure 8A:
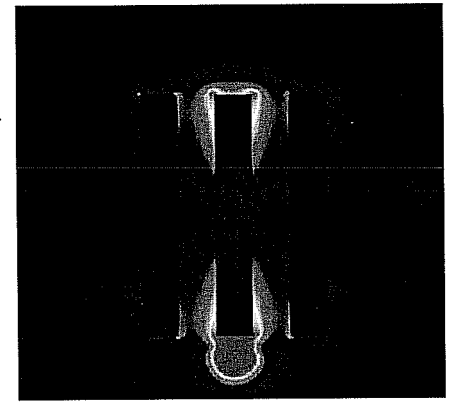
FIGS. 8(a) through 8(d) are explanatory diagrams showing numerical simulations of the optical near-field distribution transfer device of the invention in accordance with a three-dimensional finite-difference time-domain method, respectively.
Figure 8B:
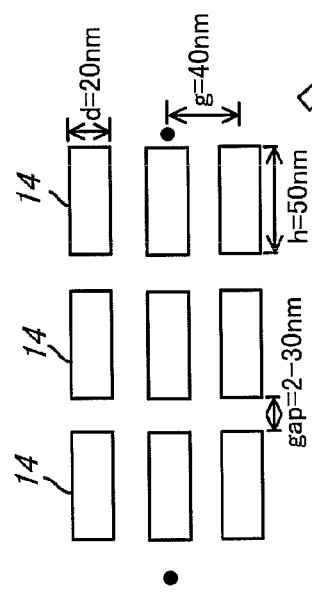
Figure 8C:
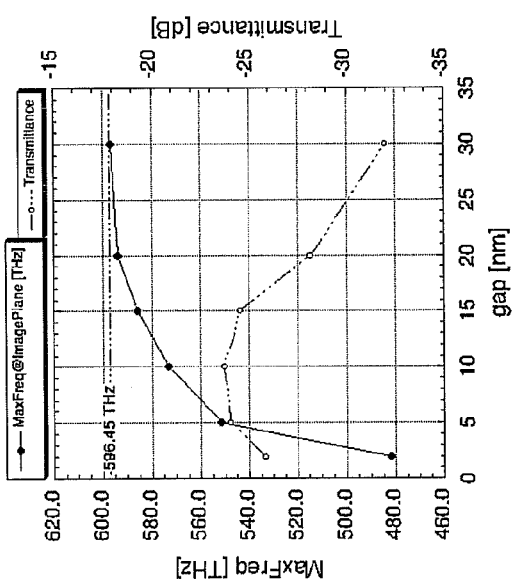
Figure 8D:
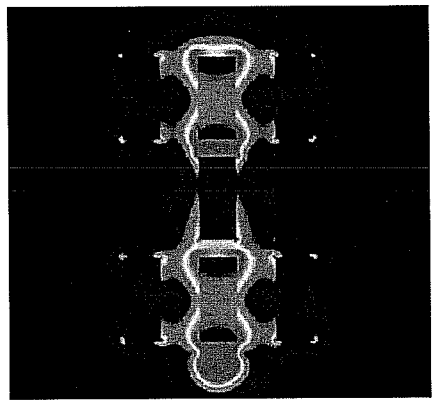

In the following, a second embodiment of the optical near-field distribution transfer device according to the invention will be described. First, FIG. 7 is a conceptual, structural, perspective view for explaining the second embodiment of the optical near-field distribution transfer device according to the present invention wherein an optical near-field distribution transfer device 100 is different from the optical near-field distribution transfer device 10 according to the above-described first embodiment in that the optical near-field distribution transfer device 100 is provided with a laminated structure wherein a plurality of small rods 14 is stacked with each other in the axial direction (two small rods in the structure shown in FIG. 7) in a predetermined gap distance; and these small rods are arrayed.

The results of the numerical simulations of the optical near-field distribution transfer device 100 wherein a diameter d of a silver rod being the small rod 14 is 20 nm, a length h of the small rod 14 is 50 nm, a spacing g is 40 nm, and a gap distance is varied from 2 to 30 nm in accordance with a three-dimensional finite-difference time-domain method are shown in FIGS. 8(*a*) through 8(*d*).

FIG. 8(*a*) shows a constitution of the optical near-field distribution transfer device 100 used in the numerical simulations; and the device is provided with a laminated structure wherein three small rods 14 each having a length h of 50 nm are stacked to each other in the axial direction with a gap distance.

According to the optical near-field distribution transfer device 100 which is obtained by stacking three small rods 14 each having a length h of 50 nm to each other in the axial direction, the operating wavelength becomes 528.32 nm so that shortening of the operating wavelength is possible (see FIG. 8(*c*)), while the optimum operating wavelength is 1094.85 nm in the case that the small rods 14 each having a length h of 150 nm are used (see FIG. 8(*b*)). Furthermore, the intensity at the ends on the output side is higher in the optical near-field distribution transfer device 100 than that of the optical near-field distribution transfer device 10 (see FIGS. 8(*b*) and 8(*c*)).

FIG. 8(*d*) shows a graph indicating the variations of transmittance (the transmittance means that of transfer transmissivity (decibel)) and MaxFreq@IP (theMaxFreq@IP means the optimum transfer frequency in an image plane) in the case that a gap distance is changed.

Figure 9:
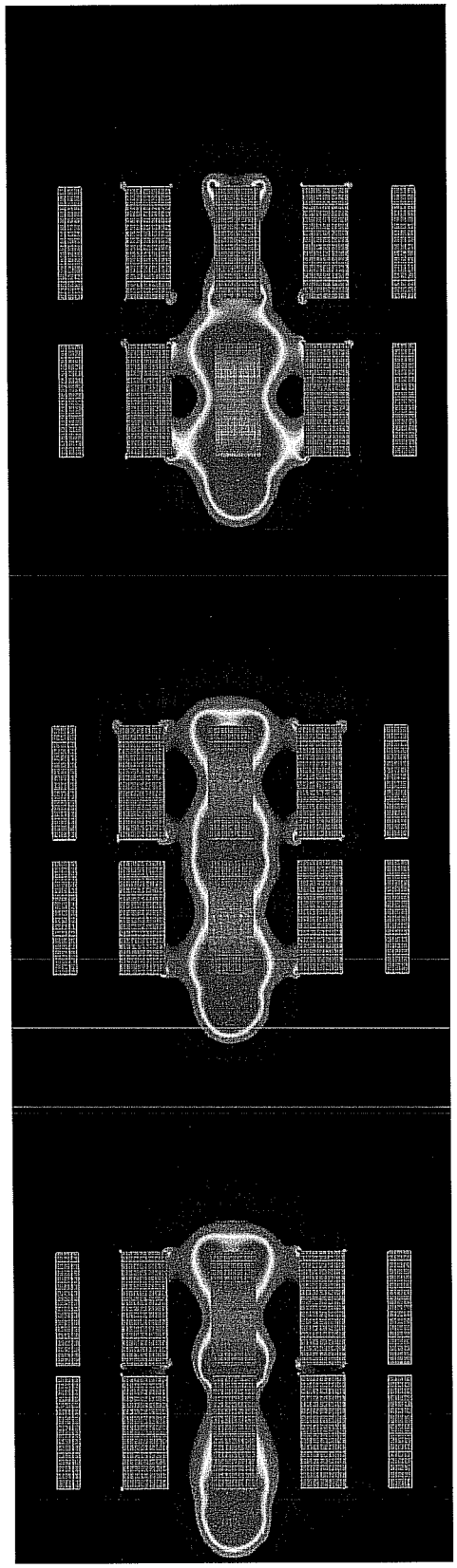
FIG. 9 is an explanatory view showing numerical simulations of the optical near-field distribution transfer device of the invention in accordance with a three-dimensional finite-difference time-domain method.

FIG. 9 is an image view showing the case wherein a gap distance is changed into 5 nm, 10 nm, and 20 nm in an optical near-field distribution transfer device 100 obtained by stacking two small rods 14 each having a length h of 50 nm to each other in the axial direction wherein the small rod 14 is a silver rod having a diameter d of 20 nm; and they are disposed with a spacing of 40 nm.

In the examples shown in FIG. 9, an optical near-field is transferred the most remarkably in the case that the small rods are stacked to each other with a gap distance of 10 nm.

Figure 10:
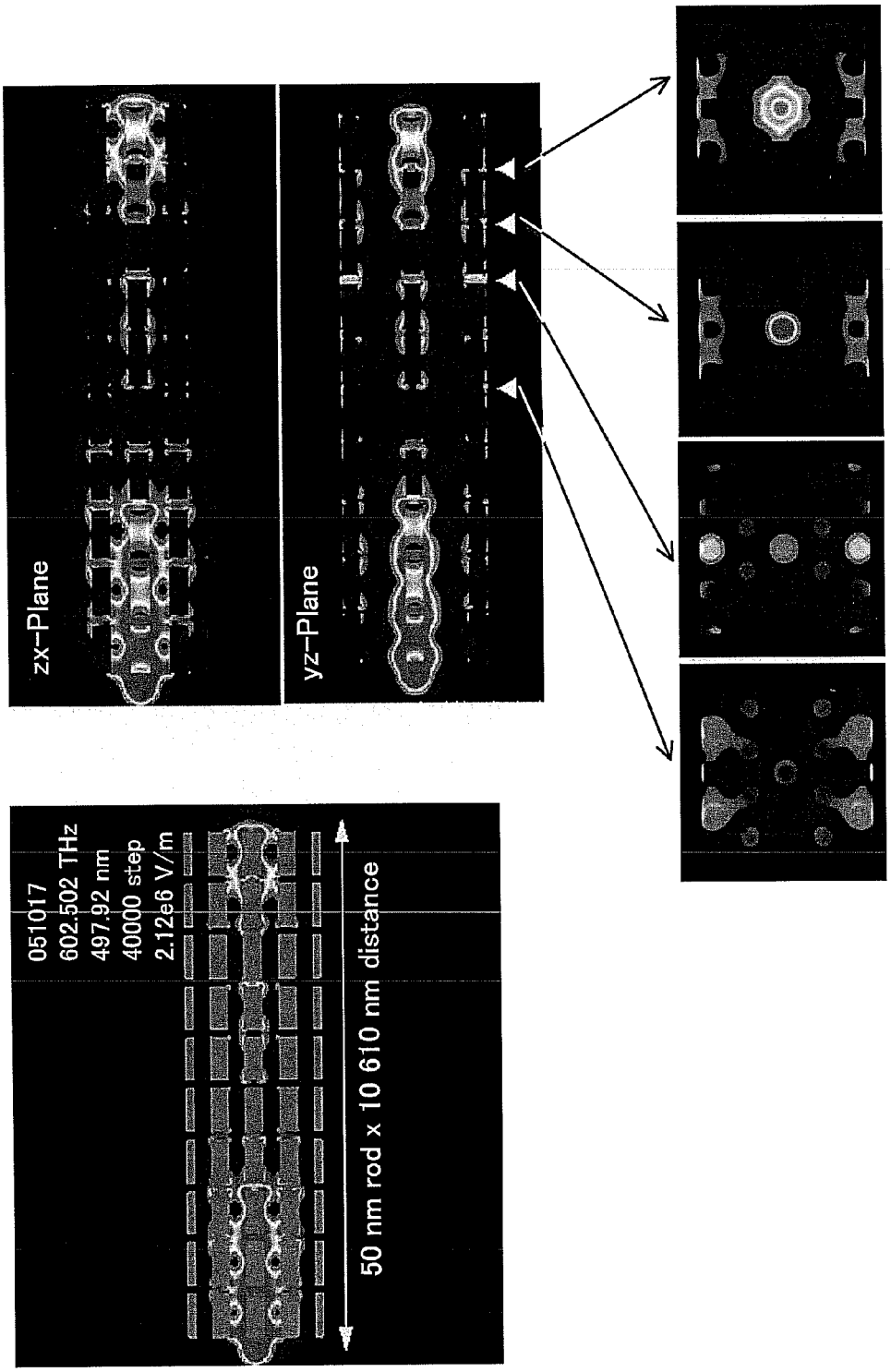
FIG. 10 is an explanatory view showing numerical simulations of the optical near-field distribution transfer device of the invention in accordance with a three-dimensional finite-difference time-domain method.

FIG. 10 is an image view showing the results of numerical simulations of an optical near-field distribution transfer device 100 obtained by stacking ten small rods 14 used in the examples shown in FIG. 9 with each other in the axial direction.

As mentioned above, it is confirmed that an optical near-field can also be transferred in the optical near-field distribution transfer device 100 obtained by stacking ten of the small rods 14 with each other in the axial direction.

Namely, although the degrees of freedom of transfer distance and light source wavelength are limited in only the case that a plurality of the small rods 14 are aligned in a single layer, it becomes possible to transmit a two-dimensional near-field in a longer distance, so that an image transfer can be made in a wavelength order, when the small rods 14 are stacked in the axial direction.

That is, when the small rods 14 are stacked in the axial direction, a long-distance light transfer of a wavelength order becomes possible in a visual wavelength region without inducing the localized plasmon resonance of a longer wavelength and higher mode peculiar to a longer rod. Consequently, according to the optical near-field distribution transfer device 100, the transfer efficiency thereof is improved three-times higher than that of the optical near-field distribution transfer device 10 wherein the small rods 14 are arranged in a single layer. In this case, when the gap distance between stacked layers is controlled, it becomes possible to easily select a transfer light frequency.

Figure 11:
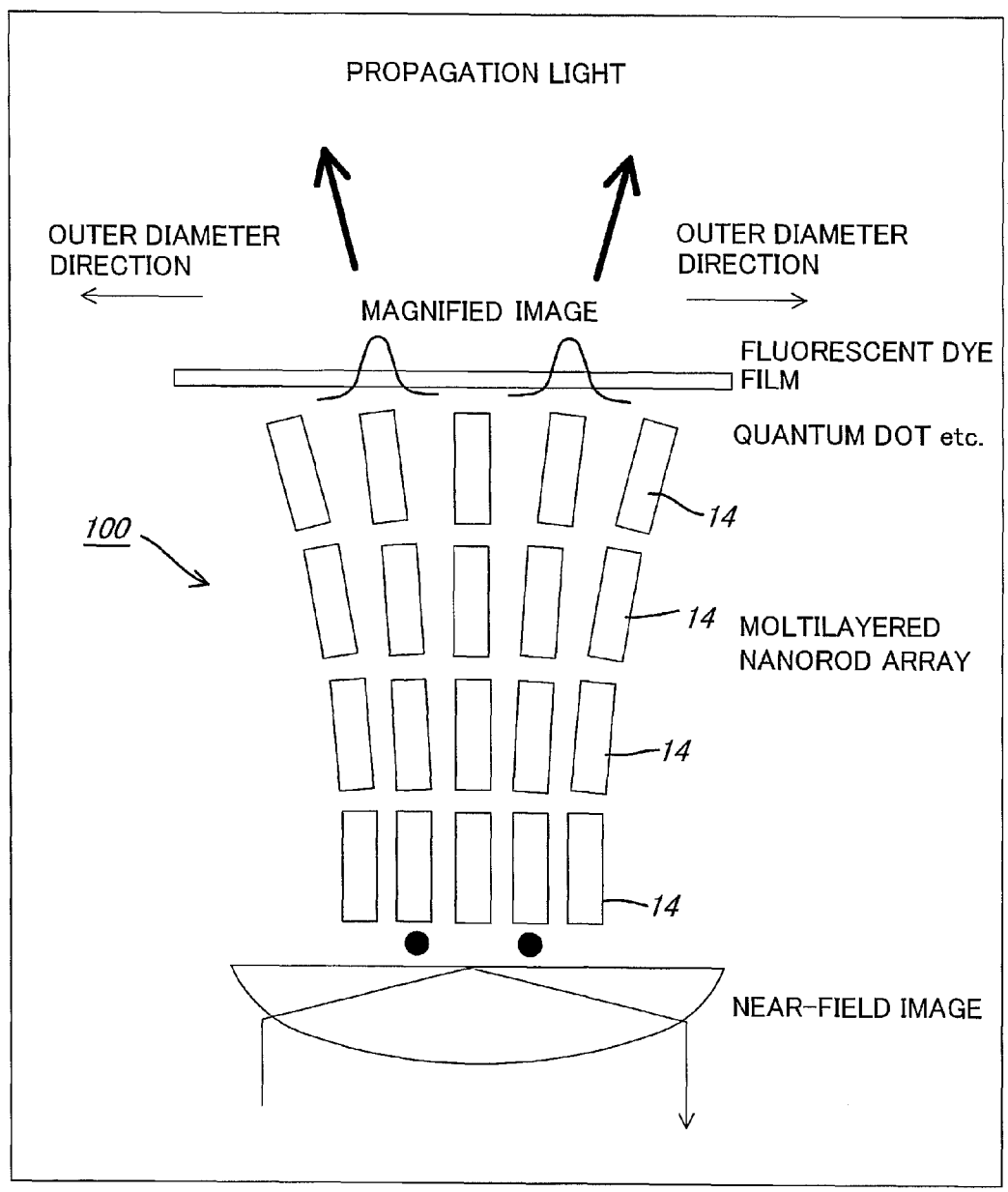
FIG. 11 is a modified example of the conceptual, structural, perspective view for explaining the second embodiment of the optical near-field distribution transfer device according to the present invention.

Next, FIG. 11 shows a structure for magnifying an image to be transferred. Namely, when the small rods 14 constituting the optical near-field distribution transfer device 100 are stacked in such that the spacing of a plurality of the small rods 14 at the output end becomes larger to the outer diameter direction thereof in the case that the small rods 14 are laminated with a gap distance, the image to be transferred can be magnified.

Moreover, as described above, when fluorescent dye or quantum dots are attached on the end of the optical near-field distribution transfer device on the output side, an output image can be converted into a propagating light.

FIG. 12 is a tabular presentation on the setting range and characteristic properties of respective parameters for controlling the characteristic properties of the optical near-field distribution transfer device 10 and 100.

Namely, concerning a diameter d of the small rod 14, the minimum value is a nanometer order, and the maximum value is in a range of around ½ of the applied wavelength. When a diameter d of the small rod 14 increases, the resonance wavelength shifts to the range of a shorter wavelength.

Moreover, a spacing g between the adjacent small rods 14 should be a distance wherein the electric field emerging from one of the small rods 14 does not coupled to the adjacent small rod 14. This distance varies due to a refractive index of the surrounding medium 12; and the larger refractive index gives rise to the smaller allowable spacing between the rods. For example, the distance (allowable spacing) is 40 nm or more in the case that a refractive index of the surrounding medium is 1, and a diameter of the small rod 14 is 20 nm.

Next, as to a length h of the small rod 14, the length h is, for example, several nm or more; and the principle limit is determined in view of the applied wavelength. There is a report with respect to a single rod of around 10 μm (see "R. M. Dickson and L. A. Lyon, J. Phys. Chem. B 104, 6095 (2000)").

Figure 13:
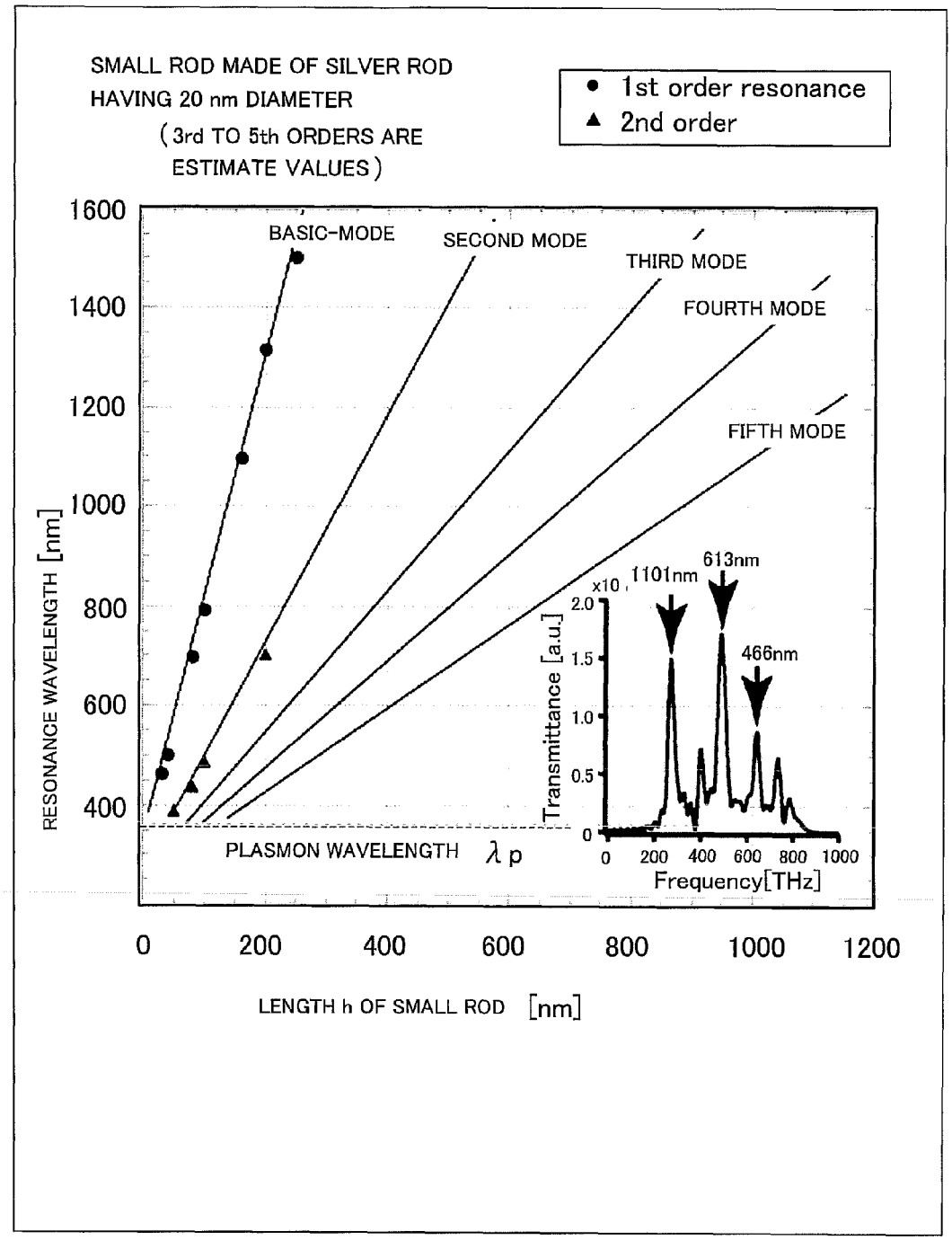
FIG. 13 is a graph indicating a relationship between the aspect ratio (length/diameter) of a small rod and the resonance wavelength, i.e. an example of a relationship between a length h of the small rod and the resonance wavelength; and the inside graph indicates the resonance frequency in the case that a length h of the small rod is 150 nm.

Furthermore, there are the linear relationships between an aspect ratio (length h/diameter d) of the small rod 14 and the resonance wavelength as illustrated in FIG. 13, so that a degree of freedom is remarkable in case of designing the optical near-field distribution transfer device 10 and 100 with including a refractive index of the surrounding medium 12 (see "J. R. Krenn, G. schider, W. Rechberger, B. Lamprecht, A. Leitner, F. R. Aussenegg, and J. C. Weeber, Appln. Phys. Lett. 77, 3379 (2000)").

Moreover, a material of the small rod 14 is an electric conductor which has a conductivity $\in_m$ satisfying the condition:

$$\in_m \leq -\in_d \; (\in_d: \text{conductivity of the surrounding medium 12}).$$

Specifically, the electric conductor is a material body made from Ag, Au, Cu, Al, Ni or Pt and the like material.

A material of the surrounding medium 12 is a dielectric material or a semiconductor which has Ed satisfying the condition:

$$\in_d \geq 1.$$

Specifically, glass, $SiO_2$, $Al_2O_3$, or the like is used as a dielectric material, while Si, GaAs, GaN, AlAs or the like is used as a semiconductor. With respect to a refractive index n, when $$n = \sqrt{\in_d}$$

takes a high value, the resonance wavelength shifts to the side of long wavelength.

Next, with respect to an operating wavelength, it is required to be a wavelength equal to or higher than the excitation wavelength $\lambda_p$ of plasmon decided by material of small rod 14 used. Specifically, it is required to be around 390 nm in case of Au, and to be around 360 nm in case of Ag. Although transfer arises at an arbitrary wavelength in equal to or higher than the limit wavelength, the efficiency is high at the resonance wavelength, when the condition is set as described above.

Figure 14:
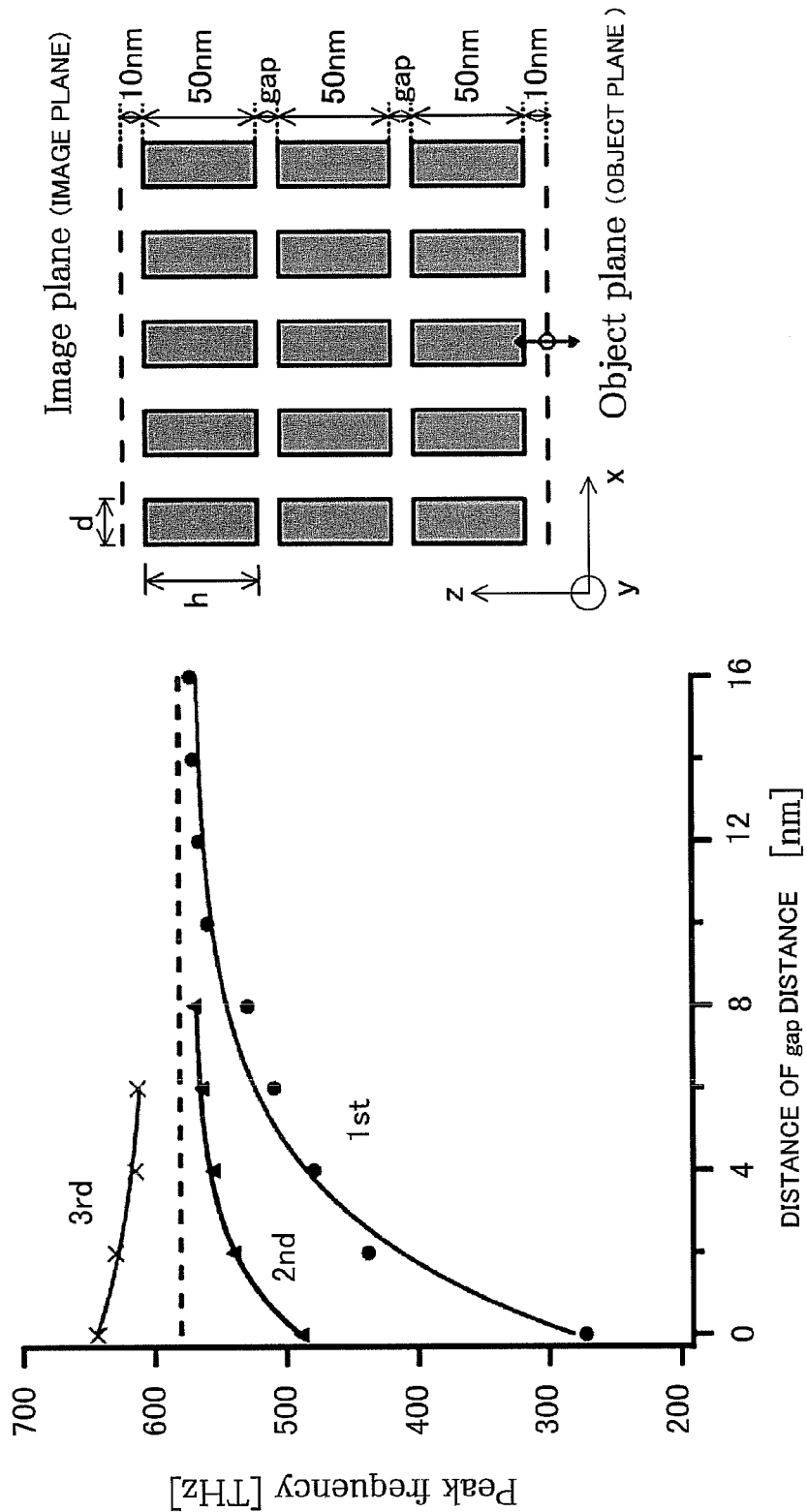
FIG. 14 is a graph indicating a relationship between a distance of each gap distance in small rods in the case that they are laminated and resonance frequencies wherein the diameter d of a small rod is 20 nm, a length h is 50 nm, and small rods are laminated in three layers.

In the case that a plurality of the small rods 14 is stacked to each other with a gap distance in the axial direction to laminate the small rods, the gap distance is 30 nm or less. As a gap distance approaches to zero, the peak frequency is converged to the resonance condition of a continuous long single small rod 14, while with the increase of the gap distance, the peak frequency shifts to the side of a short wavelength to be converged to the resonance condition of a short single small rod 14 (see FIG. 14).

The above-described optical near-field distribution transfer device 10 and 100 may be comparatively easily fabricated by a technique for forming a nanohole arrangement obtained by a chemical treatment in self-organization which is remarkably developed in recent years, or a usual semiconductor process. Specifically, they are a metal rod template method by a formation of hole arrangement of anodic alumina which has been heretofore been well known, an alternately electroplating method of a metal and a dielectric material, a reverse transfer method, a template fabrication method by hole formation due to two-photon absorption laser ablation and the like methods.

The above-described embodiments may be modified as shown in the following paragraphs (1) to (4).

(1) In the above-described embodiments, although solid metal rods are used as the rods for transfer, the invention is not limited thereto as a matter of course. Namely, materials other than metal may be used so far as they are the materials which are described in FIG. 12; and a solid rod is formed from such materials as described above and the rod obtained may be used as a small rod 14.

(2) In the above-described embodiments, although solid metal rods are used as the rods for transfer, the invention is not limited thereto as a matter of course. Namely, materials which are not the materials as described by referring to FIG. 12 such as glass materials, and resin materials may be used by such a manner that the surface of a material of glass or resin materials is coated with any of the materials as described by referring to FIG. 12 to use the material coated as a small rod 14. Alternatively, a hollow cylinder wherein the top and bottom surfaces is molded by the use of any of the materials as described by referring to FIG. 12 may be used as a small rod 14.

(3) In the above-described embodiments, although the small rod 14 has a columnar shape, the invention is not limited thereto as a matter of course, but the small rod may have a triangular prism, quadratic prism, or polyangular equal to or higher than pentagonal prism shape.

(4) The above-described embodiments and the modifications described in the above paragraphs (1) to (3) may be properly combined with each other.

INDUSTRIAL APPLICABILITY

The present invention may be used for lithography in the manufacture of integrated circuits, the development of new materials, or researches in bioscience. More specifically, the invention may be applied to a device for image transfer in nanoregions such as new-generation lithography, and new bioimaging technology. Furthermore, the invention may be applied to not only a mere imaging application, but also a new nanointerface of a conventional microoptics device and an electric device, a very compact interference device of plasmon waves and so on.

The invention claimed is:

1. An optical near-field distribution transfer device, characterized by that:

a plurality of small rods, each of which is formed by a metallic material having a substantially columnar shape and the dielectric constant $\in_m$ thereof meets the condition:

$$\in_m \leq -\in_d$$

with respect to a dielectric constant $\in_d$ of a surrounding medium, wherein a diameter of the small rod is substantially equal to or less than ½ of the wavelength of the optical near-field to be input to the small rod and the small rods are erected at predetermined spacing on a two-dimensional plane in such that the axial directions of the small rods extend in predetermined directions, respectively; and an optical near-field is input to one end of each of the small rods arranged such that the plurality of small rods is erected to convert the optical near-field into a resonant electron oscillation along the small rods with respect to the optical near-field input and to transfer a localized surface plasmon polariton to the end on the opposite side of the small rods, whereby a distribution of the optical near-field is obtained on the other end of the small rods.

2. The optical near-field distribution transfer device as claimed in claim 1, characterized by that:

the predetermined spacing corresponds to a distance wherein an electric field emerging from the small rod does not bind to the adjacent small rod.

3. The optical near-field distribution transfer device as claimed in claim 1, characterized by that:

a length of the small rod is 10 µm or less.

4. The optical near-field distribution transfer device as claimed in claim 1, characterized by that:

the surrounding medium is a dielectric material or a semiconductor meeting the condition:

$$\in_d \geq 1.$$

5. The optical near-field distribution transfer device as claimed in claim 4, characterized by that:

the dielectric material is glass, $SiO_2$, or $Al_2O_3$; and
the semiconductor is Si, GaAs, GaN, or AlAs.

6. The optical near-field distribution transfer device as claimed in claim 1, characterized by that:

the predetermined material is Ag, Au, Cu, Al, Ni, or Pt.

7. The optical near-field distribution transfer device as claimed in claim 1, characterized by that:

a plurality of the small rods is stacked to each other in the axial direction in a predetermined gap.

8. The optical near-field distribution transfer device as claimed in claim 7, characterized by that:

the predetermined gap is 30 nm or less.

9. The optical near-field distribution transfer device as claimed in claim 8, characterized by that:

the small rods obtained by stacking a plurality of small rods to each other in the axial direction wherein the small rods are extended in the axial directions different from each other with respect to the two-dimensional plane.

* * * * *